United States Patent
Kanada et al.

(10) Patent No.: US 6,461,725 B1
(45) Date of Patent: Oct. 8, 2002

(54) FINELY FOAMED PRESSURE-SENSITIVE ADHESIVE TAPE OR SHEET AND METHOD FOR PRODUCING THE SAME

(75) Inventors: Mitsuhiro Kanada; Takayuki Yamamoto; Tomohiro Taruno; Tomohide Bamba; Yoshihiro Minamizaki, all of Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/456,911

(22) Filed: Dec. 7, 1999

(30) Foreign Application Priority Data

Dec. 8, 1998 (JP) .............................. 10-348056

(51) Int. Cl.[7] .............................. C09J 7/02; C08J 9/12; B29C 44/34
(52) U.S. Cl. ................. 428/317.1; 428/41.5; 428/317.3; 428/317.5; 428/317.7; 428/355 R; 427/208.4; 427/244
(58) Field of Search .............................. 428/41.5, 317.1, 428/317.3, 317.5, 317.7, 355 R, 355 AC; 427/208.4, 244

(56) References Cited

U.S. PATENT DOCUMENTS 5,436,061 A * 7/1995 Hanneman et al. ...... 427/208.4
5,597,648 A * 1/1997 Hanneman et al. ........ 428/40.7
5,851,617 A * 12/1998 Keiser ........................ 428/41.8
6,224,938 B1 * 5/2001 Bamba et al. ........... 428/208.4

FOREIGN PATENT DOCUMENTS

EP   0 537 785 A1   4/1993

OTHER PUBLICATIONS

XP–002147346—Sep. 13, 1994 (Abstract).
08199125—Aug. 6, 1996 (Abstract).
S.K. Goel et al.; Generation of Microcellular Polymers Using Supercritical $CO_2$, vol. 12, No. 4, pp. 251–274.
Search Report.

* cited by examiner

Primary Examiner—Daniel Zirker
(74) Attorney, Agent, or Firm—Sughrue Mion, PLLC

(57) ABSTRACT

A finely foamed pressure-sensitive adhesive tape or sheet possessing a pressure-sensitive adhesive layer having a fine cell size and cell wall thickness is disclosed. The tape or sheet is obtained by impregnating the pressure-sensitive adhesive tape or sheet with carbon dioxide in a liquid state or a supercritical state, and reducing the pressure to foam the pressure-sensitive adhesive layer. The main component of the pressure-sensitive adhesive layer is, for example, an acrylic resin or a rubber-based resin. The method provides a finely foamed pressure-sensitive adhesive tape or resin possessing a pressure-sensitive adhesive layer having a fine cell structure such that an average cell size d is from 0.01 to 1000 $\mu$m, an average cell wall thickness t is from 0.01 to 2000 $\mu$m, and the ratio t/d is in the range of from 0.5 to 3.5.

4 Claims, No Drawings

FINELY FOAMED PRESSURE-SENSITIVE ADHESIVE TAPE OR SHEET AND METHOD FOR PRODUCING THE SAME

FIELD OF THE INVENTION

The present invention relates to a finely foamed pressure-sensitive adhesive tape or sheet having a pressure-sensitive adhesive layer having fine foams or cells formed therein.

BACKGROUND OF THE INVENTION

It has been attempted to improve an adhesive force, a tearing force and a shearing force and impart a shape follow-up property and a cushion property by forming gas bubbles or fine pores in a pressure-sensitive adhesive layer of a pressure-sensitive adhesive tape or sheet, and to reduce a material cost by lowering the density of the pressure-sensitive adhesive layer.

Conventional method of forming gas bubbles in the pressure-sensitive adhesive layer includes a method of coating or adding a chemical foaming agent or a physical foaming agent (organic solvent, water, etc.) on or to a backing or a pressure-sensitive adhesive layer and decomposing or evaporating the foaming agent by heating and a method of mechanically intermixing foams in a pressure-sensitive adhesive layer. For example, JP-A-10-140107 (the term "JP-A" as used herein means an "unexamined published Japanese patent application") discloses a method of coating a volatile substance on a backing, coating a pressure-sensitive adhesive thereon, and gasifying the volatile substance by heating to form many closed cells in the pressure-sensitive adhesive layer. JP-A-9-221614 discloses a method of intermixing hollow fillers into a pressure-sensitive adhesive layer. Further, JP-A-8-67861 discloses a method of adding a thermal decomposition-type foaming agent into a hot-melt pressure-sensitive adhesive and foaming it by heating.

However, in those methods, contamination of impurities such as decomposition residues of chemical foaming agent, water, etc., into the pressure-sensitive adhesive layer is unavoidable, and such impurities are undesirable in using as the pressure-sensitive adhesive. Further, it is difficult to control the size and the content of foams and it is also difficult to obtain a uniform cell size. Furthermore, in those methods, it is very difficult to form foams having a foam size of 100 μm or smaller.

As a method of forming finer foams, JP-A-8-199125 discloses a method of placing a pressure-sensitive adhesive sheet in a high-pressure gas atmosphere to dissolve the atmospheric gas in the pressure-sensitive adhesive layer, and then releasing the pressure. However, since in this method, the atmospheric gas is introduced into the pressure-sensitive adhesive layer in a gaseous state, the amount of the gas impregnated is insufficient and it is therefore difficult to obtain a foamed pressure-sensitive adhesive layer having a cell structure having a fine cell size and a fine cell wall thickness. As a result, a foamed pressure-sensitive adhesive tape having an excellent resistance to repulsion is not obtained.

SUMMARY OF THE INVENTION

Accordingly, one object of the present invention is to provide a finely formed pressure-sensitive adhesive tape or sheet provided with a pressure-sensitive adhesive layer having a cell structure with a fine cell size and a fine cell wall thickness, which have not yet been realized by the conventional chemical foaming agents or physical foaming agents, and a method for producing the same.

Another object of the present invention is to provide a finely foamed pressure-sensitive adhesive tape or sheet having a high pressure-sensitive adhesive property and an excellent resistance to repulsion, and a method for producing the same.

Still another object of the present invention is to provide a finely foamed pressure-sensitive adhesive tape or sheet that a pressure-sensitive adhesive constituting a pressure-sensitive adhesive layer is not contaminated and the material cost can be reduced, and a method for producing the same.

As a result of various investigations to attain the above-described objects, it has been found that if a pressure-sensitive adhesive layer is foamed with carbon dioxide in a liquid state or a supercritical state, a fine cell structure constituted of fine cell size and fine cell wall thickness can be formed. The present invention has been completed based on this finding, According to one embodiment of the present invention, there is provided a method for producing a finely foamed pressure-sensitive adhesive tape or sheet, which comprises impregnating a pressure-sensitive adhesive tape or sheet provided with a pressure-sensitive adhesive layer with carbon dioxide in a liquid state or a supercritical state, and foaming the pressure-sensitive adhesive layer by reducing a pressure. The main constituent of the pressure-sensitive adhesive layer is, for example, an acrylic resin or a rubber-based resin.

According to another embodiment of the present invention, there is provided a finely foamed pressure-sensitive adhesive tape or sheet provided with a pressure-sensitive adhesive layer having a fine cell structure having an average cell sized of from 0.01 to 1,000 μm, an average cell wall thickness t of from 0.01 to 2,000 μm, and a ratio t/d of the average cell wall thickness t to the average cell size d in the range of from 0.5 to 3.5.

According to still another embodiment of the present invention, there is provided a finely foamed pressure-sensitive adhesive tape or sheet provided with a pressure-sensitive adhesive layer having a fine cell structure having an average cell size d of from 0.01 to 15 μm and an average cell wall thickness t of from 0.01 to 30 μm.

DETAILED DESCRIPTION OF THE INVENTION

The present invention is described in detail below.

In the present invention, carbon dioxide in a liquid state or a supercritical state is used as the means of foaming the pressure-sensitive adhesive layer. Of inert gases, carbon dioxide can be converted into a liquid state and a supercritical state at comparatively low temperature and low pressure, and also gives small influence to pressure-sensitive adhesives, such that it does not modify or decompose the pressure-sensitive adhesives. For this reason, its production equipment is not so complicated and the pressure-sensitive adhesive constituting the pressure-sensitive adhesive layer is not contaminated. Further, since carbon dioxide is inexpensive, the production cost can be reduced. The critical temperature $T_c$ of carbon dioxide is 31° C. and the critical pressure $p_c$ thereof is 75.3 kgf/cm$^2$ (7.38 MPa).

Rubber-based pressure-sensitive adhesives and acrylic resin-based pressure-sensitive adhesives are suitably used as the pressure-sensitive adhesive in the present invention.

The rubber-based pressure-sensitive adhesives are obtained by using an elastomer as the main component and adding thereto a tackifier resin, a softening agent, an antioxidant, a filler, etc. The elastomer is a polymer having a low glass transition point and having a wide rubbery flat region up to high temperature, and examples thereof include natural rubbers (NR); synthetic rubbers such as an isoprene rubber (IR), a styrene•butadiene rubber (SBR), a styrene•butadiene block copolymer (SBS), a styrene•isoprene block copolymer (SIS), a butyl rubber, polyisobutylene, polyvinyl isobutyl ether, a chloroprene rubber, a nitrile rubber or a graft rubber, and a thermoplastic elastomer. However, the elastomer used in the present invention is not limited to those.

Th tackifier resin, softening agent, antioxidant and filler are not particularly limited, and conventional materials can be used. For example, examples of the tackifier resin include a rosin-based resin, a terpene-based resin, a petroleum resin (e.g., an aliphatic petroleum resin, an aromatic petroleum resin or a hydrogenize petroleum resin), a coumarone•indene resin and a styrene-based resin. A particularly preferred rubber-based pressure-sensitive adhesive includes a pressure-sensitive adhesive comprising a styrene•isoprene block copolymer or a natural rubber-based elastomer as the main component.

The acrylic pressure-sensitive adhesive is a copolymer comprising an acrylic acid ester as the main monomer component and more specifically is a copolymer obtained bycopolymerizing a main monomer having a low glass transition temperature giving a pressure-sensitive adhesive property with a comonomer for giving an adhesive property and a cohesive force and further with a functional group-monomer for improving a crosslinking property and a pressure-sensitive adhesive property. Examples of the main monomer include ethyl acrylate (EA), butyl acrylate (BA), 2-ethylhexyl acrylate (2-EHA), isooctyl acrylate and isononyl acrylate. Examples of the comonomer include vinyl acetate (VAc), acrylonitrile (AN), acrylamide (AM), styrene (St), methyl methacrylate (MMA) and methyl acrylate (MA). Examples of the functional group-containing monomer include carboxyl group-containing monomers such as methacrylic acid (MMA), acrylic acid (AA) or itaconic acid (IA), hydroxyl group-containing monomers such as hydroxyethyl methacrylate (HEMA) or hydroxypropyl methacrylate (HPMA), amino group-containing monomers such as dimethylaminoethyl methacrylate (DM), amide group-containing monomers such as acrylamide (AM) or methylolacrylamide (N-MAN), epoxy group-containing monomers such as glycidyl methacrylate (GMA), and acid anhydride group-containing monomers such as maleic anhydride.

The common points in those pressure-sensitive adhesives are that the glass transition temperature of the monomer constituting the pressure-sensitive adhesive is lower than room temperature and is from about −100° C. to several tens ° C. (for example 30° C.), the polymer is in a rubbery flat region in a room temperature region, and has a flexibility.

A backing for the pressure-sensitive adhesive tape or sheet used in the present invention is not particularly limited. Examples of the backing include cloths; papers; plastic films such as a film of cellophane, polyvinyl chloride, polypropylene, polyethylene, polyester, teflon or polyimide; and laminates of those. Preferable backing is a material that requires a long time for the impregnation of carbon dioxide as compared to a pressure-sensitive adhesive and is difficult to foam.

The layer structure of the pressure-sensitive adhesive tape or sheet can be various structures comprising appropriate combination of the pressure-sensitive adhesive layer, the backing, and other layer. Examples of the structure include a structure in which a back treatment layer is provided on one side of the backing and the pressure-sensitive adhesive layer is formed on the other side thereof, a structure wherein the pressure-sensitive adhesive layer is formed on one side of the backing, a structure wherein the pressure-sensitive adhesive layer is formed on both sides of the backing, and a structure wherein a backing is not used and a release liner for preventing adhesion is adhered to the pressure-sensitive adhesive surface of the pressure-sensitive adhesive layer.

The formation of the pressure-sensitive adhesive layer can be carried out by any of conventional methods. Examples of the method include a method of coating a solution formed by dissolving a pressure-sensitive adhesive in a solvent or a dispersion formed by dispersing a pressure-sensitive adhesive in water using a coater, a method of melting a resin by heating and coating the melt by a hot-melting system, a method of coating by a calender and a method of coating a monomer or an oligomer for forming a pressure-sensitive adhesive on a backing, and then polymerizing the monomer or oligomer to form a pressure-sensitive adhesive layer.

In the method of the present invention, foaming the pressure-sensitive adhesive layer is carried out by impregnating a pressure-sensitive adhesive tape or sheet with carbon dioxide in a liquid state or a supercritical state and then reducing a pressure.

More specifically, for example, the pressure-sensitive adhesive tape or sheet is placed in a pressure vessel. The pressure-sensitive adhesive tape placed in the vessel may be a sheet-form or a roll-form. The temperature in the pressure vessel at the time of placing the pressure-sensitive adhesive tape or sheet therein is not particularly limited, but it is preferred that the temperature is near the temperature of carbon dioxide introduced. This is because if, for example, the temperature is elevated after introducing the fluid of carbon dioxide into the pressure vessel, the pressure in the inside increases by the density increase of the fluid.

The carbon dioxide fluid in a liquid state or a supercritical state is then poured in the pressure vessel and the pressure-sensitive adhesive tape or sheet is impregnated with the fluid. The impregnation conditions in this case are not particularly limited so long as carbon dioxide is in a liquid state or a supercritical state. However, where liquid-state carbon dioxide is used, the impregnation pressure is from 40 to 300 kgf/cm$^2$, and preferably from about 50 to 75.3 kgf/cm$^2$, and the impregnation temperature is, for example, from about 10 to 31° C. On the other hand where carbon dioxide in a supercritical state is used, the impregnation pressure is, for example, from about 75.3 to 300 kgf/cm$^2$ and the impregnation temperature is, for example, from 31 to 130° C., and preferably from about 40 to 120° C. The impregnation time can appropriately be selected according to the kind of the pressure-sensitive adhesive, the impregnation pressure and the impregnation temperature, but the time is preferably longer than the time that requires the impregnated amount of carbon dioxide in the pressure-sensitive adhesive layer to reach its saturation. If the impregnated amount of carbon dioxide in the pressure-sensitive adhesive layer is in a saturated state, the pressure-sensitive adhesive layer having uniform cells (foams or bubbles) formed therein can be obtained by foaming. The impregnation time is generally from about 10 seconds to 24 hours.

Carbon dioxide is impregnated and the pressure is then dropped, so that carbon dioxide dissolved in the pressure-sensitive adhesive layer forms foaming nuclei. The foaming nuclei expand to form cells, and the cells grow. Growth of the cells stops when the inside pressure of the cells is finally balanced with the modulus of elasticity of the pressure-sensitive adhesive. Pressure drop is usually carried out by discharging carbon dioxide from the pressure vessel. In this case, it is preferred that pressure drop is quickly conducted so as to reach the pressure in the pressure vessel to an atmospheric pressure in a short period of time, preferably within one minute. By quickly conducting the pressure drop, carbon dioxide impregnated in the pressure-sensitive adhesive layer becomes in an gaseous state in the inside of the pressure-sensitive adhesive layer without being discharged from the pressure-sensitive adhesive layer, and cells form and grow using the pressure difference between the pressure in the cells and the pressure (atmospheric pressure) outside the pressure-sensitive adhesive layer as a driving force, whereby the pressure-sensitive adhesive layer smoothly foams.

The foamed structure, such as a cell size or a wall thickness, of the cells formed in the pressure-sensitive adhesive layer is controlled by adjusting the impregnation pressure, the impregnation temperature and the impregnation time. Since the polymer constituting the pressure-sensitive adhesive used in the present invention is in a rubbery flat region at the above-described foaming temperature and has a flexibility, cells can easily grow. Accordingly, it is possible to vary the cell size and the cell wall thickness in a very wide range by appropriately controlling the impregnation conditions. For example, the method of the present invention can form the pressure-sensitive adhesive layer having a fine cell structure with an average cell size d of from 0.01 to 1,000 $\mu$m, preferably from 0.1 to 500 $\mu$m, and an average cell wall thickness t of from 0.01 to 2,000 $\mu$m, preferably from 0.1 to 1000 $\mu$m. In particular, the pressure-sensitive adhesive layer having a very fine cell structure with an average cell sized of from 0.01 to 15 $\mu$m (more preferably from 0.1 to 10 $\mu$m) and an average cell wall thickness t of from 0.01 to 30 $\mu$m (more preferably from 0.1 to 20 $\mu$m) can easily be formed. In the finely foamed pressure-sensitive adhesive tape or sheet having such a pressure-sensitive adhesive layer, the apparent modulus of elasticity lowers, the stress relaxing property is improved and the resistance to repulsion which is one of the pressure-sensitive adhesive characteristics is greatly improved, due to the fine cell structure.

Particularly preferred pressure-sensitive adhesive tape is that the ratio t/d of the average cell wall thickness t to the average cell size d is from 0.5 to 3.5, and more preferably from about 0.8 to 3. In such a pressure-sensitive adhesive tape, the cell wall thickness is similar to the cell size, so that the stress relaxing property is largely improved and very excellent resistance to repulsion is obtained, without lowering the pressure-sensitive adhesive characteristics.

According to the method of the present invention, the pressure-sensitive adhesive layer having the cell structure with a fine cell size and a fine cell wall thickness, which has not yet been realized by conventional chemical foaming agents or physical foaming agents, can be formed. Further, the pressure-sensitive adhesive constituting the pressure-sensitive adhesive layer is not contaminated due to the use of carbon dioxide, and the relative density of the pressure-sensitive adhesive layer is lowered by forming foams, whereby the material cost can be reduced. The finely foamed pressure-sensitive adhesive tape of the present invention shows an excellent resistance to repulsion while retaining high pressure-sensitive adhesive properties.

The present invention is explained in more detail by reference to the following examples, but it should be understood that the invention is not construed as being limited thereto.

The test of resistance to repulsion was conducted as follows.

Surface of an aluminum sheet having a width of 10 mm, a length of 90 mm and a thickness of 0.4 mm was sufficiently washed with a solvent, only a pressure-sensitive adhesive layer of a pressure-sensitive adhesive tape was adhered to the surface thereof. The aluminum sheet was deformed such that the pressure-sensitive adhesive layer was outside, the curvature radius became 25 mm, and the long side direction of the aluminum sheet became semi-circle form seeing from the side, and the aluminum sheet was allowed to stand for one hour. The aluminum sheet was adhered to an acrylic resin plate through the pressure-sensitive adhesive layer. The assembly was allowed to stand for 24 hours at room temperature, and the warpage amount of the aluminum sheet after 24 hours was measured. The smaller the warpage amount, the better the resistance to repulsion.

EXAMPLE 1

To toluene as a solvent were added 100 parts by weight of a natural rubber (NR), 100 parts by weight of a terpene-based tackifier (YS resin PX1150) and 3 parts by weight of a trifunctional isocyanate-based crosslinking agent (Coronate L) such that the solid content base was 30% by weight, followed by sufficiently stirring to prepare a coating liquid. The coating liquid was coated on the surface of a polyester film having a thickness of 40 $\mu$m that was subjected a back treatment with a silicone-based resin such that the pressure-sensitive adhesive layer after solvent drying had a thickness of 40 $\mu$m, and the solvent was dried by a heating oven. After placing the pressure-sensitive adhesive tape in a pressure vessel, carbon dioxide in a supercritical state was injected therein, and the tape was maintained under a pressure of 250 kgf/cm$^2$ at a temperature of 40° C. for 10 minutes. The pressure was released to the atmospheric pressure over a period of about 2 seconds to prepare a foamed pressure-sensitive adhesive tape. An average cell size and average cell wall thickness of cells formed in the pressure-sensitive adhesive layer of the foamed pressure-sensitive adhesive tape were measured and also the test of resistance to repulsion was conducted. The results obtained are shown in the Table below.

COMPARATIVE EXAMPLE 1

The test of resistance to repulsion was conducted in the same manner as in Example 1 except that the pressure-sensitive adhesive layer was not foamed. The results obtained shown the Table below.

EXAMPLE 2

To toluene as a solvent were added a copolymerized pressure-sensitive adhesive polymer made of 95 parts by weight of butyl acrylate (BA) and 5 parts by weight of acrylic acid (AA), and 3 parts by weight of a trifunctional isocyanate-based crosslinking agent (Coronate L) such that the solid content base was 30% by weight, followed by sufficiently stirring to prepare a coating liquid. The coating liquid was coated on the surface of the same type of a polyester film as used in Example 1 such that the pressure-sensitive adhesive layer after solvent drying had a thickness of 40 $\mu$m,. and the solvent was dried by a heating oven. The pressure-sensitive adhesive tape was placed in a pressure vessel and the pressure-sensitive adhesive layer was impregnated with carbon dioxide in a supercritical state under the same conditions as in Example 1. The pressure was released to prepare a foamed pressure-sensitive adhesive tape. An average cell size and average cell wall thickness of cells formed in the pressure-sensitive adhesive layer of the foamed pressure-sensitive adhesive tape were measured and also the test of resistance to repulsion was conducted. The results obtained are shown in the Table below.

COMPARATIVE EXAMPLE 2

The test of resistance to repulsion was conducted in the same manner as in Example 2 except that the pressure-sensitive adhesive layer was not foamed. The results obtained shown the Table below.

EXAMPLE 3

To toluene as a solvent were added 100 parts by weight of a styrene•isoprene block copolymer SIS (Krayton 1107) and 100 parts by weight of a hydrogenated petroleum resin-based tackifier (Arkon P115) such that the solid content base was 40% by weight, followed by sufficiently stirring to prepare a coating liquid. The coating liquid was coated on the surface of the same type of a polyester film as used in Example 1 such that the pressure-sensitive adhesive layer after solvent drying had a thickness of 40 $\mu$m, and the solvent was dried by a heating oven. The pressure-sensitive adhesive tape was placed in a pressure vessel, the pressure-sensitive adhesive layer was impregnated with carbon dioxide in a supercritical state under the same conditions as in Example 1, and the pressure was released to prepare a foamed pressure-sensitive adhesive tape. An average cell size and average cell wall thickness of cells formed in the pressure-sensitive adhesive layer of the foamed pressure-sensitive adhesive tape were measured and also the test of resistance to repulsion was conducted. The results obtained are shown in the Table below.

COMPARATIVE EXAMPLE 3

The test of resistance to repulsion was conducted in the same manner as in Example 3 except that the pressure-sensitive adhesive layer was not foamed. The results obtained shown the Table below.

TABLE

| | Average cell size ($\mu$m) | Average cell wall thickness ($\mu$m) | Warpage amount (mm) |
|---|---|---|---|
| Example 1 | 4 | 5 | 5.15 |
| Comparative Example 1 | — | — | 10.5 |
| Example 2 | 3 | 3 | 0.75 |
| Comparative Example 2 | — | — | 1.5 |
| Example 3 | 2 | 5 | 0 |
| Comparative Example 3 | — | — | 0.75 |

What is claimed is:

1. A method for producing a finely foamed pressure-sensitive adhesive tape or sheet, which comprises impregnating a pressure-sensitive adhesive tape or sheet comprising a pressure-sensitive adhesive layer with carbon dioxide in a liquid state or a supercritical state, and forming a finely foamed pressure-sensitive adhesive layer by subjecting the tape or sheet to reduced pressure.

2. A method for producing a finely foamed pressure-sensitive adhesive tape or sheet as claimed in claim 1, wherein the main component of the pressure-sensitive adhesive layer is an acrylic resin or a rubber-based resin.

3. A finely foamed pressure-sensitive-adhesive tape or sheet comprising a pressure-sensitive adhesive layer having a fine cell structure such that an average cell size d is from 0.01 to 1000 $\mu$m, an average cell wall thickness t is from 0.01 to 2000 $\mu$m, and the ratio t/d of the average cell wall thickness t to the average cell size d is in the range of from 0.5 to 3.5.

4. A finely foamed pressure-sensitive adhesive tape or sheet comprising a pressure-sensitive adhesive layer having a fine cell structure such that an average cell size d is from 0.01 to 15 $\mu$m and an average cell wall thickness t is from 0.01 to 30 $\mu$m.

* * * * *